(12) United States Patent
Suzuki

(10) Patent No.: US 7,651,244 B2
(45) Date of Patent: Jan. 26, 2010

(54) ELECTRO-OPTICAL DEVICE AND ELECTRONIC APPARATUS HAVING THE SAME

(75) Inventor: Tomio Suzuki, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 204 days.

(21) Appl. No.: 11/980,311

(22) Filed: Oct. 30, 2007

(65) Prior Publication Data

US 2008/0117652 A1 May 22, 2008

(30) Foreign Application Priority Data

Nov. 16, 2006 (JP) .............................. 2006-309939

(51) Int. Cl.
*F21V 9/00* (2006.01)
*F21V 7/04* (2006.01)
*G02B 6/10* (2006.01)

(52) U.S. Cl. ...................... 362/293; 362/622; 362/627

(58) Field of Classification Search ................ 362/293, 362/294, 627, 622

See application file for complete search history.

(56) References Cited

U.S. PATENT DOCUMENTS

| 4,734,614 A | 3/1988 | Kuus |
| 7,172,294 B2 | 2/2007 | Yano et al. |
| 7,497,608 B2 * | 3/2009 | Wheatley et al. ............ 362/609 |
| 2006/0087863 A1 * | 4/2006 | Choi et al. .................. 362/551 |

FOREIGN PATENT DOCUMENTS

| JP | 61-285652 A | 12/1986 |
| JP | 8-76109 | 3/1996 |
| JP | 08-273630 A | 10/1996 |
| JP | 10-048590 A | 2/1998 |
| JP | 2003-140125 A | 5/2003 |

* cited by examiner

*Primary Examiner*—Stephen F Husar
*Assistant Examiner*—James W Cranson
(74) *Attorney, Agent, or Firm*—AdvantEdge Law Group, LLC

(57) ABSTRACT

It is provided an electro-optical device including an electro-optical panel having a display area on which light from a light source is incident and an optical thin film disposed on the electro-optical panel at the side on which the light is incident and covering at least a portion of the display area. The optical thin film transmits at least a light component in a first wavelength range of the light from the light source and reflects at least a light component in a second wavelength range, wavelength in the second wavelength range being longer than wavelength in the first wavelength range.

4 Claims, 5 Drawing Sheets

ELECTRO-OPTICAL DEVICE AND ELECTRONIC APPARATUS HAVING THE SAME

BACKGROUND

1. Technical Field

The present invention relates to a technical field of electro-optical devices such as liquid crystal devices and of electronic apparatuses having the electro-optical devices, such as liquid crystal projectors.

2. Related Art

In a case that a liquid crystal device, which is an example of the electro-optical devices, is used as a light valve of a liquid crystal projector, intense light from a light source is condensed and incident on the liquid crystal device for projecting an enlarged image on a screen. The incidence of such intense light from a light source raises the temperature of the liquid crystal device and, thereby, the temperature of a liquid crystal interposed between a pair of transparent substrates of the liquid crystal device, resulting in deterioration of properties of the liquid crystal. In order to solve such a problem, for example, JP-A-8-76109 (Patent Document 1) discloses technique of preventing a liquid crystal device from increasing in temperature due to infrared light. That is, a mirror having a low reflectivity of infrared light is integrated into an optical system of a liquid crystal projector, and thereby an infrared light component is eliminated from light incident on the liquid crystal device.

Furthermore, if dirt or dust (hereinafter simply referred to as "dust") is adhered to the surface of a light valve, the image of the dust is also projected on a projection screen. Therefore, the image quality may be decreased. Consequently, many liquid crystal devices additionally have dust-proof substrates on the outer surfaces of substrates for the liquid crystal devices.

However, in the technique disclosed in Patent Document 1, since a mirror having a low reflectivity of infrared light is integrated into an optical system of a liquid crystal projector, miniaturization of the optical system is difficult compared to that of a liquid crystal device not having such a mirror. Thus, there is a technical problem that miniaturization of the liquid crystal projector is difficult. In addition, extra cost for manufacturing such a mirror makes it difficult to decrease the manufacturing cost of the liquid crystal projector.

SUMMARY

An advantage of some aspects of the present invention is that an increase in temperature of an electro-optical device can be inhibited and that thereby an electro-optical device having high reliability and also an electronic apparatus including such an electro-optical device are provided.

An electro-optical device according to the present invention includes an electro-optical panel having a display area on which light from a light source is incident and an optical thin film disposed on the electro-optical panel at the side on which the light from the light source is incident. The optical thin film covers at least a portion of the display area, and transmits at least a light component in a first wavelength range of the light from the light source and reflects at least a light component in a second wavelength range, wavelength in the second wavelength range is longer than wavelength in the first wavelength range.

In the electro-optical device according to the present invention, the electro-optical panel is composed of, for example, a pair of substrates and an electro-optical material, such as a liquid crystal, interposed between the pair of substrates. In the operation of the electro-optical panel, light, such as white light, from a light source, such as a halogen lamp, is incident on the display area of the electro-optical panel. The light thus entered the electro-optical panel is modulated by the electro-optical material such as a liquid crystal according to, for example, an image signal and is projected by transmission or reflection as projection light. Then, image display in the display area is performed. An example of such electro-optical devices is a liquid crystal device which is used as a light valve of a projection-type display apparatus.

In the present invention, particularly, an optical thin film is disposed on the electro-optical panel at the side on which light from a light source is incident so as to partially cover at least the display area. The optical thin film transmits at least a light component in a first wavelength range of the light from the light source and reflects at least a light component in a second wavelength range longer than the first wavelength range. The "light component in a first wavelength range" according to the present invention is typically a visible light component and contributes to image display by the electro-optical device. The "light component in a second wavelength range" according to the present invention is typically an infrared light component and does not contribute to image display by the electro-optical device. The optical thin film is typically disposed on the outermost surface of the electro-optical panel at the side on which light from a light source is incident and covers the display area. The optical thin film is formed of, for example, a lamination film of a plurality of transparent insulating films or conducting films having different refractive indices. The refractive indices, film thicknesses, the order of lamination, and the like of the plurality of transparent insulating films or conducting films are properly determined depending on the first and the second wavelength ranges. Furthermore, the optical thin film is not limited to a lamination film and may be formed as a single layer film or a single film.

Since the optical thin film transmits a light component, which is typically a visible light component, in the first wavelength range of the light from a light source, the image display in the display area can be reliably performed. In addition, since the optical thin film reflects a light component, which is typically an infrared light component, in the second wavelength range of the light from the light source, an increase in temperature of the electro-optical panel can be inhibited or decreased. In other words, by the optical thin film, the light component in the first wavelength range, which contributes to image display, can be reliably incident on the electro-optical panel, while the light component in the second wavelength range, which may cause an increase in temperature of the electro-optical panel and does not contribute to image display, is prevented from being incident on the electro-optical panel. That is, the image display in the electro-optical panel can be reliably performed by the light component in the first wavelength range, while inhibiting useless temperature increase of the electro-optical panel caused by the light component in the second wavelength range, which does not contribute to the image display.

As described above, in the electro-optical device according to the present invention, the temperature increase during the operation can be inhibited or decreased by the optical thin film disposed on the electro-optical panel at the side on which the light from a light source is incident. Therefore, the electro-optical device capable of maintaining high-quality display properties over a long period of time and having excellent reliability can be provided.

In an electro-optical device according to an embodiment of the present invention, the optical thin film transmits a visible light component as the light component in the first wavelength range and reflects an infrared light component as the light component in the second wavelength range.

In this embodiment, the optical thin film transmits at least a visible light component and reflects at least an infrared light component. The term "visible light component" in the present invention means light which can be recognized by human eyes and has a wavelength, for example, in the range of from about 380 to about 780 nm. The term "infrared light component" in the present invention means light having a wavelength longer than that of the visible light component of the light from a light source and is, for example, light having a wavelength longer than about 780 nm. Therefore, the image display in the electro-optical panel can be reliably performed by visible light, while inhibiting a useless increase in temperature of the electro-optical panel due to infrared light.

In an electro-optical device according to another embodiment of the present invention, the optical thin film is a lamination film composed of alternately laminated zirconium oxide and silicon oxide films.

In this embodiment, for example, the optical thin film is a lamination film composed of alternately laminated zirconium oxide ($ZrO_2$) and silicon oxide ($SiO_2$) films in this order from the bottom on a surface of an opposing substrate or dust-proof substrate, composed of, for example, a quartz substrate, of the electro-optical panel. The opposing substrate or the dust-proof substrate is at the side on which the light from a light source is incident, and the surface on which the optical thin film is disposed is at the side on which the light from the light source is incident. Therefore, by the optical thin film, at least the light component in the first wavelength range of the light from the light source can be reliably transmitted and at least the light component in the second wavelength range can be reliably reflected.

Furthermore, the thickness of each zirconium oxide film and silicon oxide film may be properly determined depending on the first and second wavelength ranges.

In an electro-optical device according to another embodiment of the present invention, the optical thin film is a lamination film composed of alternately laminated niobium oxide and silicon oxide films.

In this embodiment, the optical thin film is a lamination film composed of alternately laminated niobium oxide ($Nb_2O_5$) and silicon oxide films in this order from the bottom on a surface of an opposing substrate or dust-proof substrate, composed of, for example, a quartz substrate, of the electro-optical panel. The opposing substrate or dust-proof substrate is at the side on which the light from a light source is incident, and the surface on which the optical thin film is disposed is at the side on which the light from the light source is incident. Therefore, by the optical thin film, at least the light component in the first wavelength range of the light from the light source can be reliably transmitted and at least the light component in the second wavelength range can be reliably reflected.

In an electro-optical device according to another embodiment of the present invention, the electro-optical panel includes a pair of substrates having an electro-optical material there between, and the optical thin film is disposed on a surface of one of the pair of substrates. The one of the pair of substrates is at the side on which the light is incident, and the surface on which the optical thin film is disposed is at the side on which light is incident.

In this embodiment, the light component in the second wavelength range can be reflected on the outermost surface of the electro-optical panel at the side on which the light from a light source is incident. Therefore, the temperature increase of the electro-optical panel can be reliably inhibited or decreased. Consequently, the deterioration of properties of the electro-optical material such as a liquid crystal interposed between the pair of substrates can be inhibited or prevented.

In addition, in this embodiment, the image display in the display area is performed by, for example, applying a voltage according to an image signal to the electro-optical material such as a liquid crystal.

In an electro-optical device according to another embodiment of the present invention, the electro-optical panel includes a pair of substrates having an electro-optical material there between and a pair of dust-proof substrates disposed on the pair of substrates, respectively, at the sides not facing the electro-optical material. The optical thin film is disposed on a surface of one of the pair of dust-proof substrates. The one of the pair of dust-proof substrates is at the side on which the light is incident, and the surface on which the optical thin film is disposed is at the side on which light is incident.

In this embodiment, the light component in the second wavelength range can be reflected on the outermost surface of the electro-optical panel at the side on which the light from the light source is incident. Therefore, the temperature increase of the electro-optical panel can be reliably inhibited or decreased. In addition, a decrease in image quality, which is caused by that an image of dust adhered to the pair of substrates is projected on a projection screen, can be prevented by the transparent dust-proof substrates composed of, for example, glass.

The electronic apparatus according to the present invention includes an electro-optical device according to the present invention described above, though the device is not limited to them.

Since the electronic apparatus according to the present invention includes the electro-optical device according to the present invention, various electronic apparatuses, such as a projection-type display apparatus, a mobile phone, an electronic organizer, a word processor, a viewfinder-type video tape recorder, a monitor-direct-view-type video tape recorder, a work station, a video phone, a POS terminal, and a touch panel, which can perform high-quality display and are excellent in reliability can be achieved. Furthermore, for example, electrophoresis apparatuses such as electronic paper can be achieved as electronic devices according to the present invention.

These functions and other advantages of the present invention will be apparent from the following description of embodiments.

BRIEF DESCRIPTION OF THE DRAWINGS

The invention will be described with reference to the accompanying drawings, wherein like numbers reference like elements.

DESCRIPTION OF EXEMPLARY EMBODIMENTS

The embodiments of the present invention will now be described with reference to the drawings. The following embodiments will be described using a TFT active matrix driving liquid crystal device having a built-in driving circuit as an example of the electro-optical device according to the present invention.

First Embodiment

Figure 1:
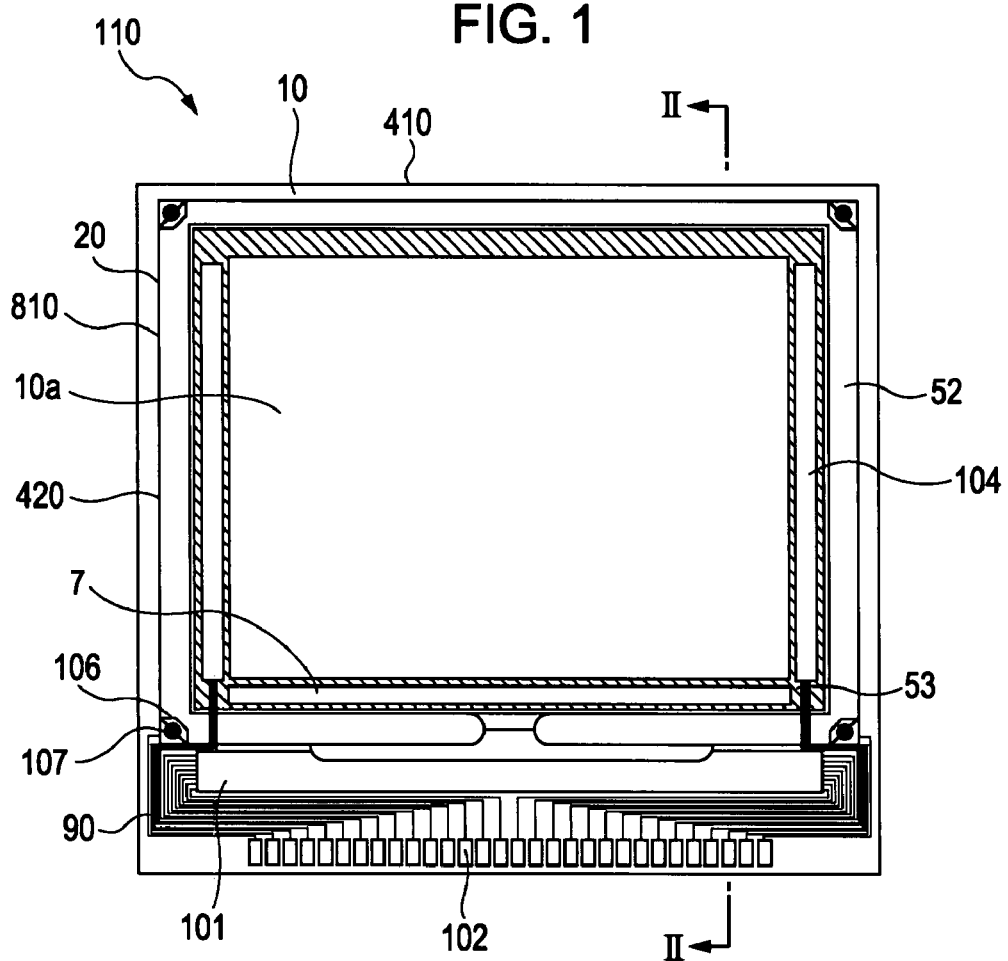
FIG. 1 is a plan view illustrating the whole structure of a liquid crystal device according to a first embodiment of the present invention.
Figure 2:
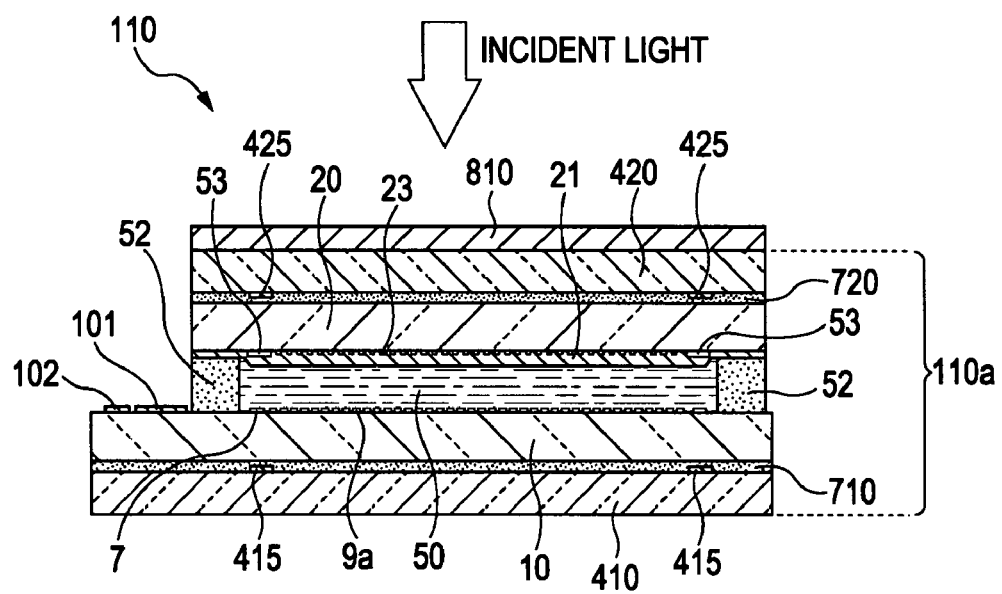
FIG. 2 is a cross-sectional view taken along the line II-II in FIG. 1.

A liquid crystal device according to a first embodiment will be described with reference to FIGS. 1 to 4. First, the whole structure of the liquid crystal device according to this embodiment will be described with reference to FIGS. 1 and 2. FIG. 1 is a plan view illustrating the whole structure of the liquid crystal device according to this embodiment, and FIG. 2 is a cross-sectional view taken along the line II-II in FIG. 1. In FIG. 2, the individual layers and components are drawn in different scales so that the films and the components can be easily recognized on the drawing.

In FIGS. 1 and 2, the liquid crystal device 110 according to this embodiment includes a liquid crystal panel 110a and an optical thin film 810 disposed on the surface of the liquid crystal panel 110a at the side on which light is incident. In the liquid crystal device 110 in this embodiment, white light from a light source such as a halogen lamp is incident on the device as incident light from the upper side in FIG. 2.

In FIGS. 1 and 2, the liquid crystal panel 110a includes a TFT array substrate 10 and an opposing substrate 20 which are arranged so as to oppose each other as an example of "a pair of substrates" according to the present invention. The TFT array substrate 10 and the opposing substrate 20 are composed of quartz glass substrates. Furthermore, the liquid crystal panel 110a includes a liquid crystal layer 50 composed of a liquid crystal interposed between the TFT array substrate 10 and the opposing substrate 20 as an example of "an electro-optical material" according to the present invention. The TFT array substrate 10 and the opposing substrate 20 are bonded to each other with a sealant 52 disposed on a sealing area on the circumference of an image display area 10a.

In FIG. 1, along the inner side of the sealing area in which the sealant 52 is arranged, a light-shielding film frame 53 having light-blocking effect is disposed at the side of the opposing substrate 20 for determining the frame area of the image display area 10a. In the periphery along the outer area of the sealing area in which the sealant 52 is arranged, a data line driving circuit 101 and external circuit connecting terminals 102 are disposed along one edge of the TFT array substrate 10. A sampling circuit 7 is disposed on a more inner peripheral side than the sealing area along the one edge so as to be covered by the light-shielding film frame 53. Scanning line driving circuits 104 are disposed on more inner peripheral sides than the sealing area along the two other edges extending perpendicularly from the one edge so as to be covered by the light-shielding film frame 53. Furthermore, on the TFT array substrate 10, vertical conducting terminals 106 for electrically connecting between the upper and lower substrates with vertical conductors 107 are disposed in the areas that oppose the four corners of the opposing substrate 20. These components provide electrical conductivity between the TFT array substrate 10 and the opposing substrate 20.

On the TFT array substrate 10, routing wirings 90 for electrically connecting the external circuit connecting terminals 102 to, for example, the data line driving circuit 101, the scanning line driving circuits 104, and the vertical conducting terminals 106 are disposed.

As shown in FIG. 2, on the TFT array substrate 10, a laminate structure including TFTs (Thin Film Transistors) for pixel switching as driving elements and wirings such as scanning lines and data lines is formed. The image display area 10a is provided with pixel electrodes 9a on a layer upper than the layer of the TFTs for pixel switching and the wirings such as scanning lines and data lines. Furthermore, a light-shielding film 23 is disposed on a surface of the opposing substrate 20 at the side facing the TFT array substrate 10. On the light-shielding film 23, an opposing electrode 21 made of a transparent material such as ITO (Indium Tin Oxide) is disposed so as to face a plurality of pixel electrodes 9a. The liquid crystal layer 50 is composed of one type or a mixture of several types of nematic liquid crystals and has a predetermined alignment between a pair of alignment films.

In addition to the data line driving circuit 101 and the scanning line driving circuits 104, for example, an inspection circuit or an inspection pattern that inspects quality and defects of the liquid crystal device during manufacturing or at shipping may be formed on the TFT array substrate 10, though they are not shown in the drawings.

As shown in FIGS. 1 and 2, in this embodiment, dust-proof substrates 410 and 420 are disposed on surfaces of the TFT array substrate 10 and the opposing substrate 20, respectively, at the sides not facing the liquid crystal layer 50. The dust-proof substrates 410 and 420 are composed of crystal glass substrates as in the TFT array substrate 10 and the opposing substrate 20 and are adhered to the TFT array substrate 10 and the opposing substrate 20, respectively, with adhesion layers 710 and 720 composed of an adhesive. Along the inner side of the sealing area in which the sealant 52 is arranged, light-shielding film frames 415 and 425 having light-blocking effect are disposed on surfaces of the dust-proof substrates 410 and 420, respectively, at the sides facing the TFT array substrate 10 and the opposing substrate 20, for determining the frame area of the image display area 10a, as in the light-shielding film frame 53 provided on the opposing substrate 20. The light-shielding film frames 415 and 425 are composed of, for example, a metal film such as aluminum (Al) or chromium (Cr).

These dust-proof substrates 410 and 420 can prevent a decrease in image quality caused by that dust is adhered to the TFT array substrate 10 or the opposing substrate 20 and an image of the dust is projected on a projection screen.

As shown in FIGS. 1 and 2, an optical thin film 810 is disposed on the surface of the liquid crystal panel 110a at the side on which light is incident, namely, on a surface of the dust-proof substrate 420, which is disposed at the opposing substrate 20 side, at the side not facing the opposing substrate 20. The optical thin film 810 is formed on the almost entire surface of the dust-proof substrate 420 so as to cover at least the image display area 10a on which light is incident. The structure and the effect of the optical thin film 810 are described in detail below.

Figure 3:
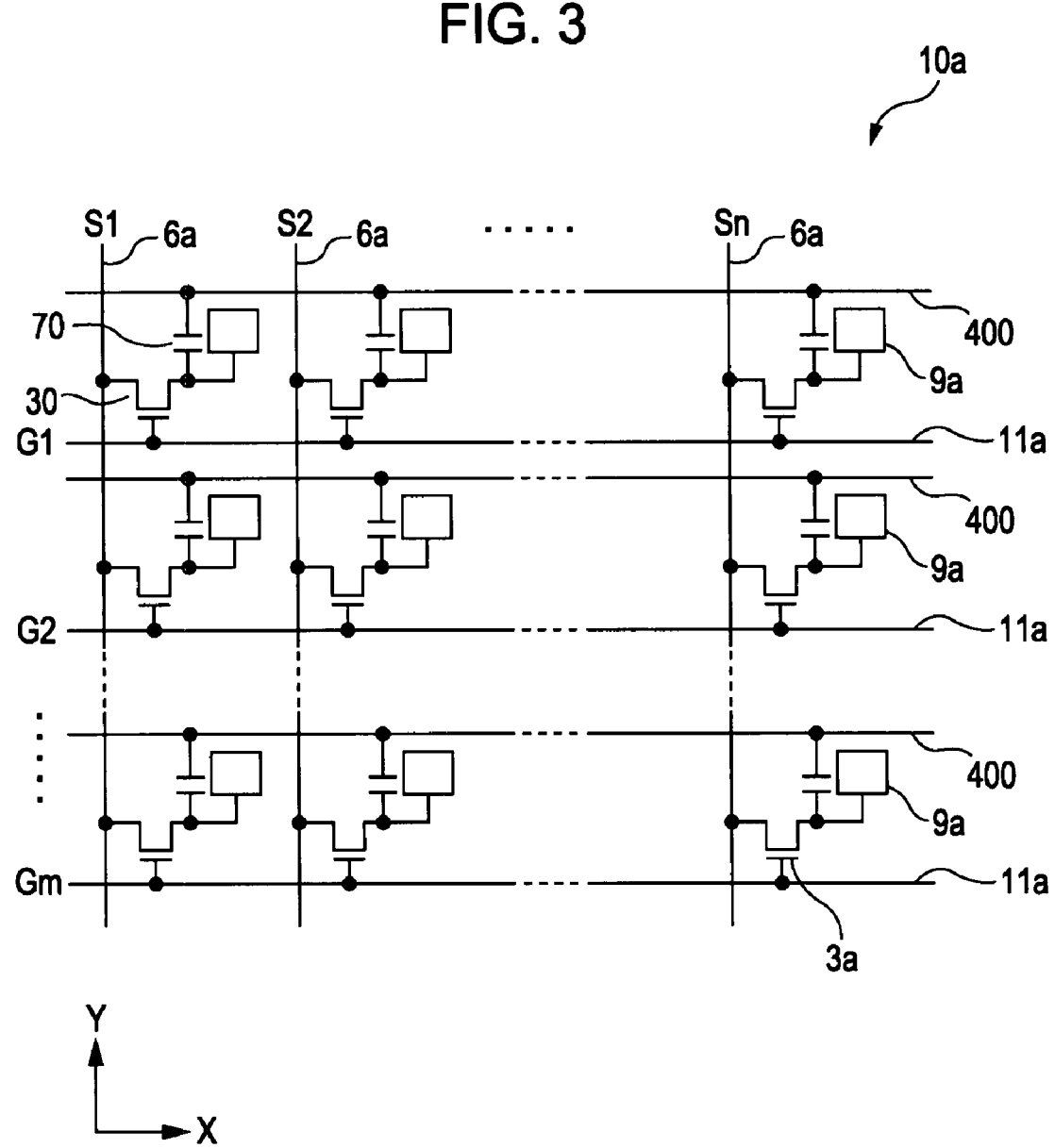
FIG. 3 is an equivalent circuit diagram of pixels in a liquid crystal device according to the first embodiment of the present invention.

An electrical structure of pixels of the liquid crystal device according to the present invention will be described with reference to FIG. 3. FIG. 3 is an equivalent circuit diagram of pixels of a liquid crystal device according to the first embodiment of the present invention.

As shown in FIG. 3, in the image display area 10a of the liquid crystal device 110, a plurality of scanning lines 11a and a plurality of data lines 6a are arranged so as to cross each other and to form pixels, which are each defined by each one of the scanning lines 11a and the data lines 6a. Each of the pixels is provided with a TFT 30, a pixel electrode 9a, and a storage capacitor 70. The TFTs 30 are provided for applying data signals S1, S2, ..., Sn supplied through the data lines 6a to selected pixels. Gates are connected to the scanning lines 11a, sources are connected to the data lines 6a, and drains are connected to the pixel electrodes 9a. The pixel electrodes 9a form liquid crystal capacitors with the opposing electrode 21 so that input data signals S1, S2, ..., Sn are applied to the pixels and are retained for a certain period of time. In each storage capacitor 70, one electrode is parallel to the pixel electrode 9a and is connected to the drain of the TFT 30, and the other electrode is connected to a potential-fixed capacitor wiring 400 so that the potential becomes constant.

The liquid crystal device 110 employs a TFT active matrix-driving system. The scanning line driving circuits 104 (refer to FIG. 1) sequentially apply scanning signals G1, G2, ..., Gm to the scanning lines 11a, and thereby the TFTs 30 in selected pixel rows in the horizontal direction become ON state. The data line driving circuit 101 (refer to FIG. 1) apply data signals S1, S2, ..., Sn to the selected pixel rows of which TFTs 30 are ON via data lines 6a. On this occasion, the data signals S1, S2, ..., Sn may be sequentially supplied to each of the data lines 6a or may be simultaneously supplied to a plurality of the data lines 6a (for example, to each group of the data lines 6a). Consequently, data signals are supplied to the pixel electrodes 9a corresponding to the selected pixels. Since the TFT array substrate 10 is disposed so as to oppose the substrate 20 via the liquid crystal layer 50 (refer to FIG. 2), an electric field is selectively applied to the liquid crystal layer 50 of each individual pixel of the thus divided and arrayed pixels, and thereby the transmitted light intensity between the both substrates is controlled by each individual pixel and an image is displayed in gray scale. The data signal retained in each pixel area is prevented from leakage by the storage capacitor 70.

Figure 4:
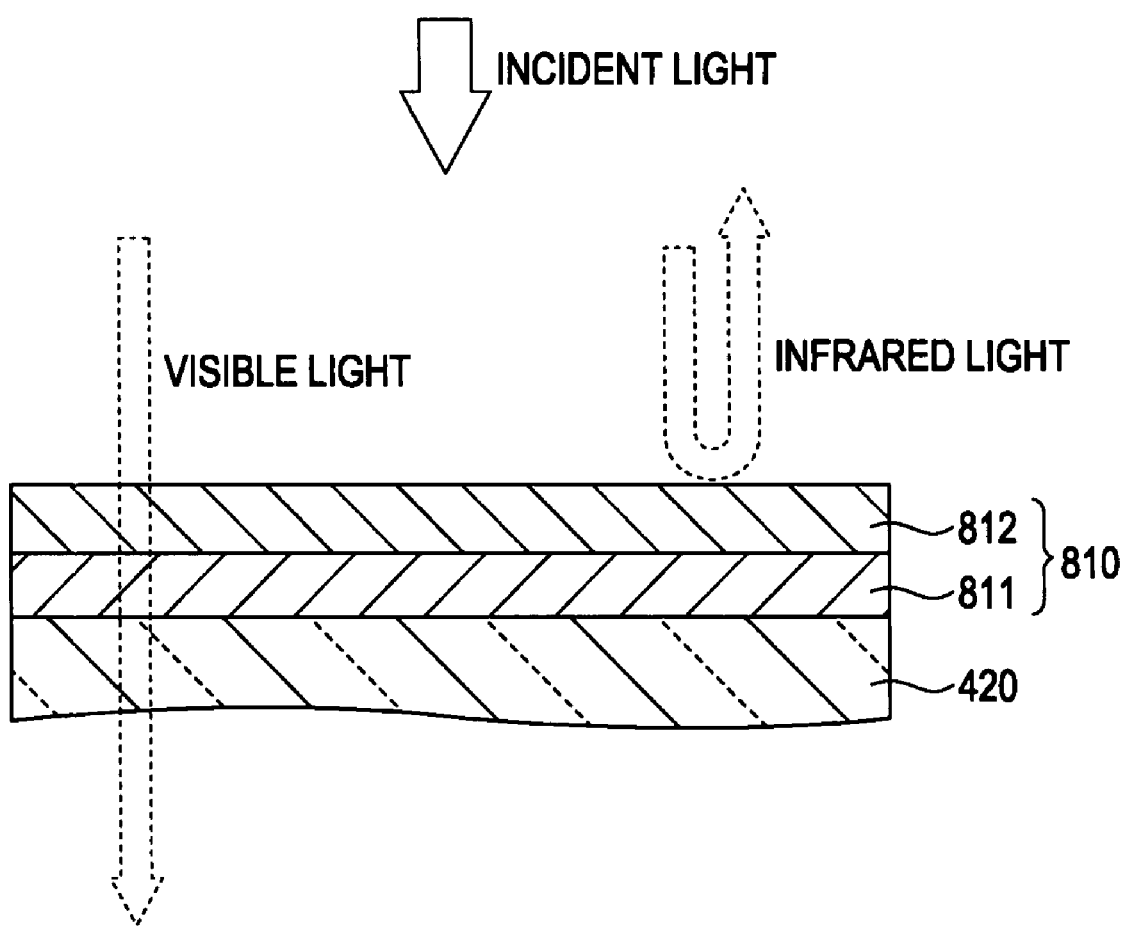
FIG. 4 is an enlarged cross-sectional view illustrating a structure of an optical thin film of the liquid crystal device according to the first embodiment of the present invention.

The structure and effect of the optical thin film of the liquid crystal device according to the present invention will now be specifically described with reference to FIGS. 1, 2, and 4. FIG. 4 is an enlarged cross-sectional view illustrating a specific structure of an optical thin film of the liquid crystal device according to this embodiment.

In this embodiment, an optical thin film 810 shown in FIG. 4 is employed. As described above with reference to FIGS. 1 and 2, the optical thin film 810 is disposed on a surface of the dust-proof substrate 420, which is disposed at the opposing substrate 20 side, at the side not facing the opposing substrate 20 and covers at least the image display area 10a on which light is incident. The optical thin film 810 is a lamination film formed by laminating a zirconium oxide film 811 composed of zirconium oxide ($ZrO_2$) and a silicon oxide film 812 composed of silicon oxide ($SiO_2$) in this order on the dust-proof substrate 420 composed of quartz glass. Furthermore, the thicknesses of the zirconium oxide film 811 and the silicon oxide film 812 of the optical thin film 810 are controlled so that the optical thin film 810 transmits a visible light component in the wavelength range of from about 380 nm to about 780 nm of incident light and reflects an infrared light component having a wavelength longer than about 780 nm. In other words, by controlling each thickness of the zirconium oxide film 811 and the silicon oxide film 812, with respect to the visible light component of incident light, each interface-reflected light is canceled to each other at the interface between the outside (typically, air) and the silicon oxide film 812, at the interface between the silicon oxide film 812 and the zirconium oxide film 811, and at the interface between the zirconium oxide film 811 and the dust-proof substrate 420. As a result, the reflection of the visible light by the optical thin film 810 is decreased or prevented and thereby the transmissivity of the visible light is increased. With respect to the infrared light component of the incident light, each interface-reflected light is enhanced to each other at each interface, and as a result, the reflection of the infrared light by the optical thin film 810 is increased and thereby the transmissivity of the infrared light is decreased.

Therefore, since the visible light component of incident light is transmitted by the optical thin film 810 and enters the image display area 10a of the liquid crystal panel 110a, the image display can be reliably performed in the image display area 10a. In addition, since the infrared light component of the incident light is reflected by the optical thin film 810 and does not enter the image display area 10a of the liquid crystal panel 110a, the temperature increase of the liquid crystal panel 110a can be inhibited or decreased. In other words, by the optical thin film 810, the visible light component, which contributes to image display, can reliably incident on the liquid crystal panel 110a, while the infrared light component, which may cause an increase in temperature of the liquid crystal panel 110a and does not contribute to image display, is prevented from being incident on the liquid crystal panel 110a. That is, the image display in the liquid crystal panel 110a can be reliably performed by the visible light component, while inhibiting useless temperature increase of the liquid crystal panel 110a caused by the infrared light component, which does not contribute to the image display.

Since useless temperature increase of the liquid crystal panel 110a can be inhibited, the deterioration of properties of the liquid crystal constituting the liquid crystal layer 50 of the liquid crystal panel 110a can be inhibited or prevented. Therefore, the liquid crystal panel 110a can maintain high-quality display properties over a long period of time. That is, the life time as an apparatus can be improved.

In this embodiment, the optical thin film 810 is a two-layer film formed by laminating a single zirconium oxide film 811 and a single silicon oxide film 812 in this order. However, the optical thin film 810 may be a multi-layer film having a multi-layer structure composed of more than two layers, such as a four-layer or six-layer film, composed of alternately laminated zirconium oxide and silicon oxide films in this order. In such a case, thicknesses of the zirconium oxide films and the silicon oxide films can be controlled in many kinds of combination of the thicknesses compared to the case of a two-layer film. Therefore, the optical thin film can transmit a visible light component and reflect an infrared light component with higher accuracy. However, a two-layer film as in this embodiment is preferred from the viewpoint of reducing the manufacturing cost for the optical thin film.

Furthermore, since the liquid crystal device 110 is provided with such an optical thin film 810, it is not required to integrate a "mirror having a low reflectivity of infrared light" into an optical system of a liquid crystal projector as in the technique disclosed in the above-mentioned Patent Document 1 by using the liquid crystal device 110 as a light valve of the liquid crystal projector. In other words, in the liquid crystal device 110, since the optical thin film 810, which is smaller in size compared to the mirror, can inhibit an increase in temperature of the liquid crystal panel 110a, the liquid crystal projector can be reduced in size and, further, can be reduced in manufacturing cost.

As described above, in the liquid crystal device 110 according to this embodiment, an increase in temperature during the operation can be inhibited or decreased by the optical thin film 810 disposed on the liquid crystal panel 110a at the side on which light is incident. Therefore, the high-quality display properties can be maintained over a long period of time, and excellent reliability can be achieved.

Second Embodiment

Figure 5:
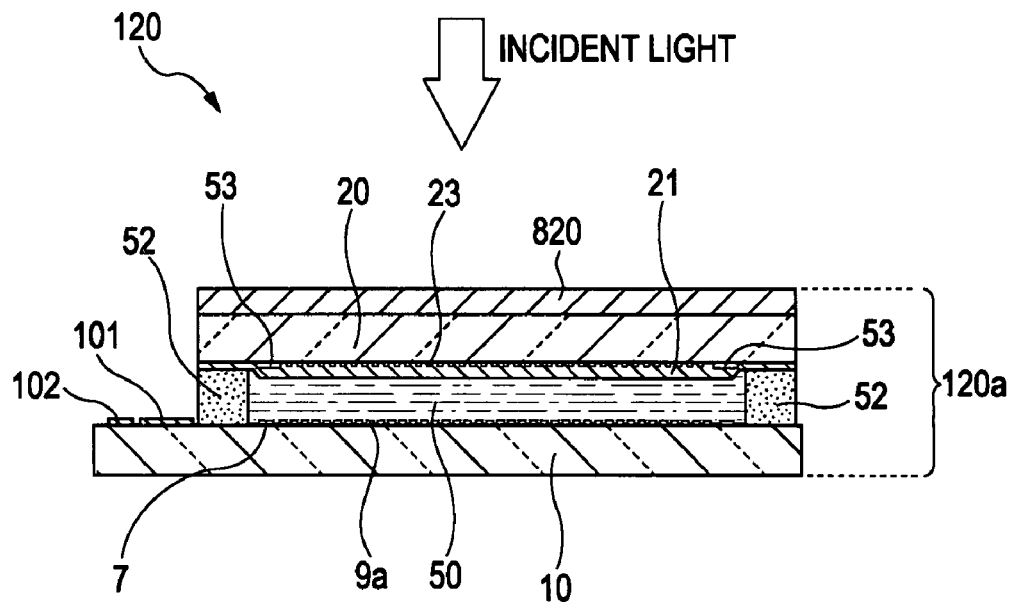
FIG. 5 is a cross-sectional view of a device according to a second embodiment of the present invention and corresponds to FIG. 2 in the first embodiment.
Figure 6:
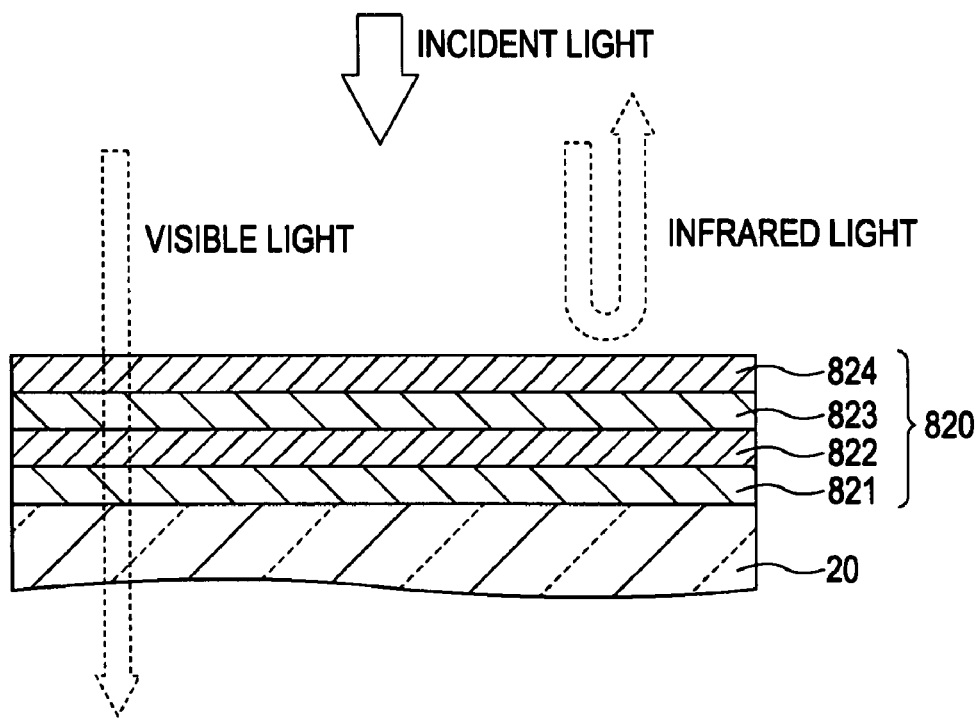
FIG. 6 is an enlarged cross-sectional view of an optical thin film according to a second embodiment of the present invention and corresponds to FIG. 4 in the first embodiment.

A liquid crystal device according to a second embodiment will now be described with reference to FIGS. 5 and 6. FIG. 5 is a cross-sectional view of a device according to a second embodiment and corresponds to FIG. 2 in the first embodiment, and FIG. 6 is an enlarged cross-sectional view of an optical thin film according to the second embodiment and corresponds to FIG. 4 in the first embodiment. In FIGS. 5 and 6, the same reference numerals as those in FIGS. 1 to 4 are used for components similar to those in the first embodiment, and their description is optionally omitted.

The structure of the liquid crystal device 120 according to the second embodiment shown in FIG. 5 is almost the same as that of the liquid crystal device 110 according to the first embodiment except that a liquid crystal panel 120a instead of the liquid crystal panel 110a in the first embodiment and an optical thin film 820 instead of the optical thin film 810 in the first embodiment are used.

The structure of the liquid crystal panel 120a is almost the same as that of the liquid crystal panel 110a in the first embodiment except that the dust-proof substrates 410 and 420 provided to the liquid crystal panel 110a in the first embodiment are not provided (consequently, the light-shielding film frames 415 and 425 and the adhesion layers 710 and 720 are also not provided).

In this embodiment, an optical thin film 820 shown in FIG. 5 is employed. The optical thin film 820 is disposed on the surface of the liquid crystal panel 120a at the side on which light is incident, namely, on the surface, not facing the liquid crystal layer 50, of the opposing substrate 20. The optical thin film 820 is formed on the almost entire surface of the opposing substrate 20 so as to cover at least the image display area 10a on which light is incident.

As shown in FIG. 6, the optical thin film 820 is a lamination film formed by laminating a niobium oxide film 821, a silicon oxide film 822, a niobium oxide film 823, and a silicon oxide film 824 in this order on the opposing substrate 20 composed of quartz glass. The niobium oxide films 821 and 823 are composed of niobium oxide ($Nb_2O_5$), and the silicon oxide films 822 and 824 are composed of silicon oxide ($SiO_2$). Furthermore, the thicknesses of the niobium oxide films 821 and 823 and the silicon oxide films 822 and 824 constituting the optical thin film 820 are controlled so that the optical thin film 820 transmits a visible light component in the wavelength range of from about 380 nm to about 780 nm of incident light and reflects an infrared light component having a wavelength longer than about 780 nm. In other words, by controlling the thickness of each of the niobium oxide films 821 and 823 and the silicon oxide films 822 and 824, with respect to the visible light component of incident light, each interface-reflected light is canceled to each other at the interface between the outside (typically, air) and the silicon oxide film 824, at the interface between silicon oxide film 824 and the niobium oxide film 823, at the interface between the niobium oxide film 823 and the silicon oxide film 822, at the interface between the silicon oxide film 822 and the niobium oxide film 821, and at the interface between the niobium oxide film 821 and the opposing substrate 20. As a result, the reflection by the optical thin film 820 is decreased or prevented and thereby the transmissivity is increased. With respect to the infrared light component of the incident light, each interface-reflected light is enhanced to each other at each interface, and as a result, the reflection by the optical thin film 820 is increased and thereby the transmissivity is decreased.

Therefore, since the visible light component of incident light is transmitted by the optical thin film 820 and enters the image display area 10a of the liquid crystal panel 120a, the image display in the image display area 10a can be reliably performed. In addition, since the infrared light component of incident light is reflected by the optical thin film 820 and does not enter the image display area 10a of the liquid crystal panel 120a, the temperature increase of the liquid crystal panel 120a can be inhibited or decreased. That is, the image display in the liquid crystal panel 120a can be reliably performed by the visible light component, while inhibiting useless temperature increase of the liquid crystal panel 120a caused by the infrared light component, which does not contribute to image display. In addition, since the useless temperature increase of the liquid crystal panel 120a can be inhibited, deterioration of properties of the liquid crystal constituting the liquid crystal layer 50 of the liquid crystal panel 120a can be inhibited or prevented.

In this embodiment, the optical thin film 820 is four-layer film composed of alternately laminated niobium oxide and silicon oxide films in this order. However, the optical thin film 820 may be a two-layer film formed by laminating a single niobium oxide film and a single silicon oxide film in this order or a multi-layer film composed of more than four layers, such as a six-layer or eight-layer film, composed of alternately laminated niobium oxide and silicon oxide films in this order.

Electronic Apparatus

Figure 7:
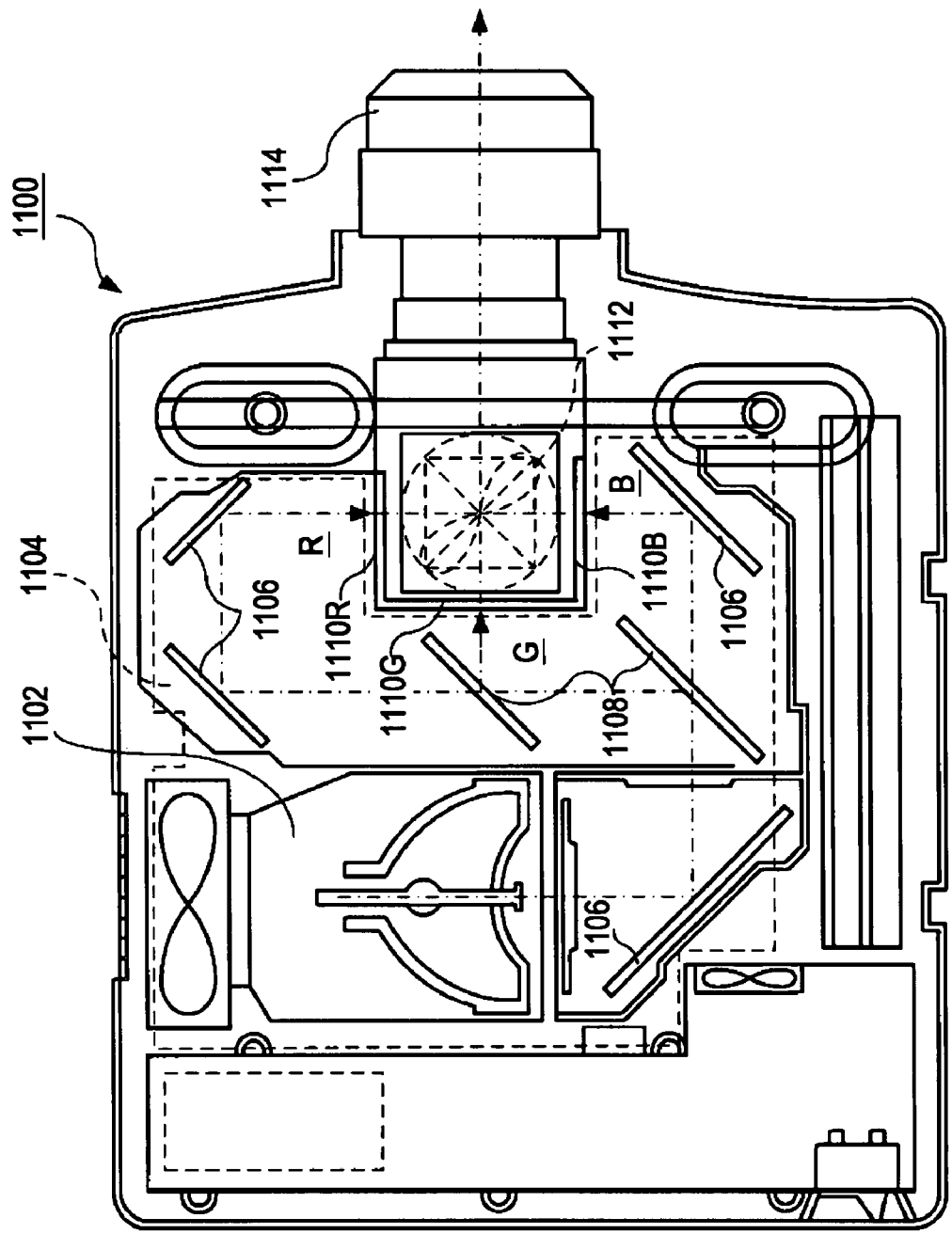
FIG. 7 is a plan view illustrating a projector as an example of the electronic apparatus including the electro-optical device according to the present invention.

Application of the above-mentioned electro-optical devices, namely, the liquid crystal devices, to various electronic apparatuses will now be described. FIG. 7 is a plan view illustrating the structure of an exemplary projector. A projector having the liquid crystal device as a light valve will now be described.

As shown in FIG. 7, a lamp unit 1102 including a white-light source such as a halogen lamp is disposed inside the projector 1100. Projection light projected from this lamp unit 1102 is separated into three primary colors of RGB by four mirrors 1106 and two dichroic mirrors 1108 arranged in a light guide 1104 and enters liquid crystal devices 1110R, 1110G, and 1110B serving as light valves corresponding to the respective primary colors.

The structures of the liquid crystal devices 1110R, 1110G, and 1110B are equivalent to that of the above-mentioned liquid crystal device and are driven by primary color signals R, G, and B, respectively, supplied from an image signal processing circuit. The light modulated by these liquid crystal devices enters a dichroic prism 1112 from three directions. In this dichroic prism 1112, while the light beams of R and B are refracted at 90 degrees, the light beam of G goes straight. Therefore, as a result of synthesis of images of the individual colors, a color image is projected on a screen or the like via a projection lens 1114.

Here, in display images by the individual liquid crystal devices 1110R, 1110G, and 1110B, it is necessary to reverse left and right of the display image by the liquid crystal device 1110G with respect to the display images by the liquid crystal devices 1110R and 1110B.

Since light beams corresponding to the individual primary colors R, G and B enter the liquid crystal devices 1110R, 1110G, and 1110B, respectively, by means of the dichroic mirror 1108, it is not necessary to provide a color filter.

In addition to the electronic apparatus described with reference to FIG. 7, examples of the electronic apparatus include a mobile-type personal computer, a mobile phone, a liquid crystal television set, a viewfinder-type video tape recorder, a monitor-direct-view-type video tape recorder, a car navigation device, a pager, an electronic organizer, a calculator, a word processor, a workstation, a video phone, a POS terminal, and a device having a touch panel. It is needless to mention that the present invention is applicable to these various apparatuses.

The present invention is not limited to the above-mentioned embodiments and can be modified within in the range of the scope or spirit which is apparent from claims and the entire description. Electro-optical devices and electronic apparatuses having the electro-optical devices which accompany such modifications are also included in the technical field of the present invention.

The entire disclosure of Japanese Patent Application No. 2006-309939, filed Nov. 16, 2006 is expressly incorporated by reference herein.

What is claimed is:

1. An electro-optical device comprising:
an electro-optical panel including a display area on which light from a light source is incident; and
an optical thin film disposed on the electro-optical panel at a side on which the light is incident and covering at least a portion of the display area, wherein
the optical thin film transmits at least a light component in a first wavelength range of the light from the light source and reflects at least a light component in a second wavelength range, the wavelength in the second wavelength range being longer than the wavelength in the first wavelength range, wherein the optical thin film is a lamination film composed of alternately laminated zirconium oxide and silicon oxide films.

2. An electro-optical device comprising:
an electro-optical panel including a display area on which light from a light source is incident; and
an optical thin film disposed on the electro-optical panel at a side on which the light is incident and covering at least a portion of the display area, wherein
the optical thin film transmits at least a light component in a first wavelength range of the light from the light source and reflects at least a light component in a second wavelength range, the wavelength in the second wavelength range being longer than the wavelength in the first wavelength range, wherein the optical thin film is a lamination film composed of alternately laminated niobium oxide and silicon oxide films.

3. An electro-optical device comprising:
an electro-optical panel including a display area on which light from a light source is incident; and
an optical thin film disposed on the electro-optical panel at a side on which the light is incident and covering at least a portion of the display area, wherein
the optical thin film transmits at least a light component in a first wavelength range of the light from the light source and reflects at least a light component in a second wavelength range, the wavelength in the second wavelength range being longer than the wavelength in the first wavelength range, wherein
the electro-optical panel includes a pair of substrates having an electro-optical material therebetween; and
the optical thin film is disposed on a surface of one of the pair of substrates, wherein the one of the pair of substrates is at the side on which light from the light source is incident and the surface on which the optical thin film is disposed is at the side on which light from the light source is incident.

4. An electro-optical device comprising:
an electro-optical panel including a display area on which light from a light source is incident; and
an optical thin film disposed on the electro-optical panel at a side on which the light is incident and covering at least a portion of the display area, wherein
the optical thin film transmits at least a light component in a first wavelength range of the light from the light source and reflects at least a light component in a second wavelength range, the wavelength in the second wavelength range being longer than the wavelength in the first wavelength range, wherein
the electro-optical panel includes a pair of substrates having an electro-optical material therebetween and a pair of dust-proof substrates disposed on the pair of substrates, respectively, at sides not opposing the electro-optical material; and
the optical thin film is disposed on a surface of one of the pair of dustproof substrates, wherein the one of the pair of dust-proof substrates is at the side on which light from the light source is incident and the surface on which the optical thin film is disposed is at the side on which light from the light source is incident.

* * * * *